US012629233B2

(12) United States Patent
Davis

(10) Patent No.: US 12,629,233 B2
(45) Date of Patent: May 19, 2026

(54) ALIGNER FINISHING LINE TRIMMING AND ALIGNERS HAVING TRIMMED FINISHING LINES

(71) Applicant: Tinnisense Solutions, LLC, New York, NY (US)

(72) Inventor: Elliot Davis, New York, NY (US)

( * ) Notice: Subject to any disclaimer, the term of this patent is extended or adjusted under 35 U.S.C. 154(b) by 211 days.

(21) Appl. No.: 18/584,587

(22) Filed: Feb. 22, 2024

(65) Prior Publication Data

US 2025/0268692 A1      Aug. 28, 2025

(51) Int. Cl.
*A61C 7/08* (2006.01)
*A61C 13/34* (2006.01)
*B23K 26/38* (2014.01)
*G06T 17/00* (2006.01)
*G06T 19/20* (2011.01)

(52) U.S. Cl.
CPC ............... *A61C 7/08* (2013.01); *A61C 13/34* (2013.01); *B23K 26/38* (2013.01); *G06T 17/00* (2013.01); *G06T 19/20* (2013.01); *G06T 2219/2016* (2013.01); *G06T 2219/2021* (2013.01)

(58) Field of Classification Search
CPC .......... A61C 7/08; A61C 13/34; B23K 26/38; G06T 17/00; G06T 19/20; G06T 2219/2016; G06T 2219/2021
See application file for complete search history.

(56) References Cited

U.S. PATENT DOCUMENTS

| | | | |
|---|---|---|---|
| 10,624,722 B1 * | 4/2020 | Culp ...................... | B23K 26/38 |
| 2008/0187887 A1 * | 8/2008 | Lu ........................... | G16H 20/40 |
| | | | 433/215 |
| 2019/0014970 A1 * | 1/2019 | Clausen ........... | A61B 1/000095 |
| 2019/0262106 A1 * | 8/2019 | Liston ..................... | A61C 8/008 |
| 2020/0125069 A1 * | 4/2020 | Sirovskiy ............... | A61C 7/002 |
| 2020/0281689 A1 * | 9/2020 | Yancey ................ | A61B 5/0064 |
| 2021/0084061 A1 * | 3/2021 | Elovici .............. | H04L 63/1425 |
| 2022/0008180 A1 * | 1/2022 | Van Der Poel ...... | A61C 19/043 |
| 2022/0087793 A1 * | 3/2022 | Sisson ................... | B33Y 10/00 |
| 2023/0005196 A1 * | 1/2023 | Khaitov .................. | A61C 7/08 |
| 2023/0218370 A1 * | 7/2023 | Azernikov ............. | A61C 9/004 |
| | | | 345/423 |

OTHER PUBLICATIONS

Elbaz et al., WO2022147160A1, Jul. 7, 2022, Align Technology, Inc(WIPO) (Year: 2022).*

(Continued)

*Primary Examiner* — YuJang Tswei
(74) *Attorney, Agent, or Firm* — Brooks, Cameron & Huebsch, PLLC

(57) ABSTRACT

A method comprising receiving intraoral scan data having data for multiple teeth and gingival surfaces surrounding the teeth; creating a three dimensional (3D) model based on the intraoral scan data; determining an interface between each tooth and the gingiva and surface shape of the gingiva between adjacent teeth based on the based on the intraoral scan data; receiving camera image data having data for the multiple teeth and gingival surfaces included in the intraoral scan data; confirming or adjusting the locations of the interface and the surface shape of the gingiva based on the camera image data to create an updated 3D model; and determining a finishing cut line based on the 3D model and whether the scan data or image data indicate gingival recession.

19 Claims, 8 Drawing Sheets

Present Disclosure 813        819 815    817   812   814

(56)          References Cited

OTHER PUBLICATIONS

Shailendran, et al., "Accuracy and reliability of tooth widths and Bolton ratios measured by ClinCheck Pro," American Journal of Orthodontics and Dentofacial Orthopedics (pp. 65-73) vol. 161, Issue 1, Jan. 2022 (9 pages).

Alswajy, et al., The Reliability of ClinCheck Accuracy before and after Invisalign Treatment—A Multicenter Retropective Study, Applied Sciences, 13, 4670, 2023 (8 pages).

Ghislanzoni, et al., "How well does Invisalign ClinCheck predict actual results: A prospective study", Craniofac. Res., 2024;00:1-9 (9 pages).

* cited by examiner

311

313

321

307 309 317 315

317

411

413

421

Prior Art

415

409

417

407

Prior Art

609

613

717

709

713

Present Disclosure

Fig. 8     813     819 815     817     812     814

ALIGNER FINISHING LINE TRIMMING AND ALIGNERS HAVING TRIMMED FINISHING LINES

FIELD OF TECHNOLOGY

The present disclosure relates to dental, periodontal, orthognathic, and orthodontic methods and processes, particularly methods for determining aligner finishing line placement and aligners formed by unique finishing line placement for use during a dental, periodontal, orthognathic, and orthodontic therapy, generally referred to herein as dental treatment.

BACKGROUND

For decades aligners have been used by dental professionals, such as orthodontists and general dentists, to reposition teeth. An aligner is a tray of material that is typically vacuum sucked over a mold (can also be 3D printed) that is similar to a patient's teeth on one jaw. This gives the aligner a shape that includes tooth shaped cavities allowing the aligner to be placed over the teeth on the jaw of the patient and thereby worn by the patient. The aligner is similar to a patient's teeth on one jaw because aligner's are used to impart force on one or more of the teeth to move the teeth and so the cavities of one or more of the teeth may be slightly different positionally to one another versus the actual tooth positions thereby encouraging the teeth to move to the positions of the aligner.

Typically, a progressive sequence of removable clear flexible aligners, each slightly different from one another made from a polymer material or layered sandwich of plastic and plastic-like material comprise a type of dental treatment. The aligners are made in sets that are used in a defined order, with each successive aligner imparting forces on the teeth thereby moving teeth little-by-little from a beginning position to an end position over the use of, typically, 15-25 aligners.

Further, dental trays are similar in shape, materials, and formation techniques to aligners but they do not impart force to move teeth. They are used to hold fluids or malleable solids (e.g., gel substance) against the teeth, such as mouthwash, whitening materials, and medications (e.g., for treating gingivitis, fluoride deficiency, hypersensitivity, weakened enamel). For simplicity, the disclosure generally refers to aligners, however, the term "aligner" as used below should be interpreted to include dental trays as well.

With typical aligners, because of the materials used to fabricate them, they substantially lose their ability to provide full tooth manipulating forces at about two weeks with their force being greater in the first week or two of use. The prevailing thought has been that it's generally advantageous to recommend wear protocols based on those known physical attributes to facilitate the necessary and desired movements. Additionally, more recent techniques employ pieces of material, called additions, attached to the surface of a tooth to provide additional leverage to increase the amount of linear force and torque that can be applied to a tooth. These actions may be causing unintended issues for the wearer, as will be discussed in more detail below.

An orthodontic aligner usually covers almost every aspect of the enamel of each tooth in the maxillary and/or mandibular arch. However, the finishing line, which is the outer edge of the aligner that can land near the tooth-gingival junction can be problematic in a few ways. Generally, the finishing line aspect of aligner design is often overlooked and, thereby, some aligner designs may include finishing line characteristics that are detrimental to the tooth movement treatment.

For example, currently, there is a scalloped design software that analyzes scanned tooth data (e.g., from an intraoral scanner generated digital file or a digitized file created from a scanned extraoral analog impression or physical model) and designs a set of laser cutting computing device readable instructions to cut the finishing line at the tooth gingival interface. Alternatively, there is a straight line approach, wherein the straight line design software analyzes the scanned tooth data to identify the highest tooth gingival interface and then designs a set of laser cutting computing device readable instructions to cut the finishing line parallel to the jaw line of the patient that is to have the aligner affixed thereto or as otherwise described below.

These are currently the two options available to dental professionals looking to design aligners for their patients. This is due in part because offering other options to the finishing line would require the software that designs the finishing lines cutting instructions to be rewritten. This software is proprietary and is controlled by the laser and/or aligner manufacturer, so dental professionals cannot access it to make changes. Further, the laser and aligner manufacturers don't see the need for any other finishing line designs because they are not yet aware of the detrimental characteristics of the current scalloped and straight line options possible in some uses, such as in cases of gingiva recession or tinnitus, as will be discussed in more detail below. Additionally, the laser and aligner manufacturers and clinicians are not yet aware that the concepts disclosed herein can lead to superior tooth movement results.

BRIEF DESCRIPTION OF THE DRAWINGS

FIG. 8 shows a close up of the cut design finishing line according to an embodiment of the present disclosure of FIG. 5.

DETAILED DESCRIPTION

Figure 1:
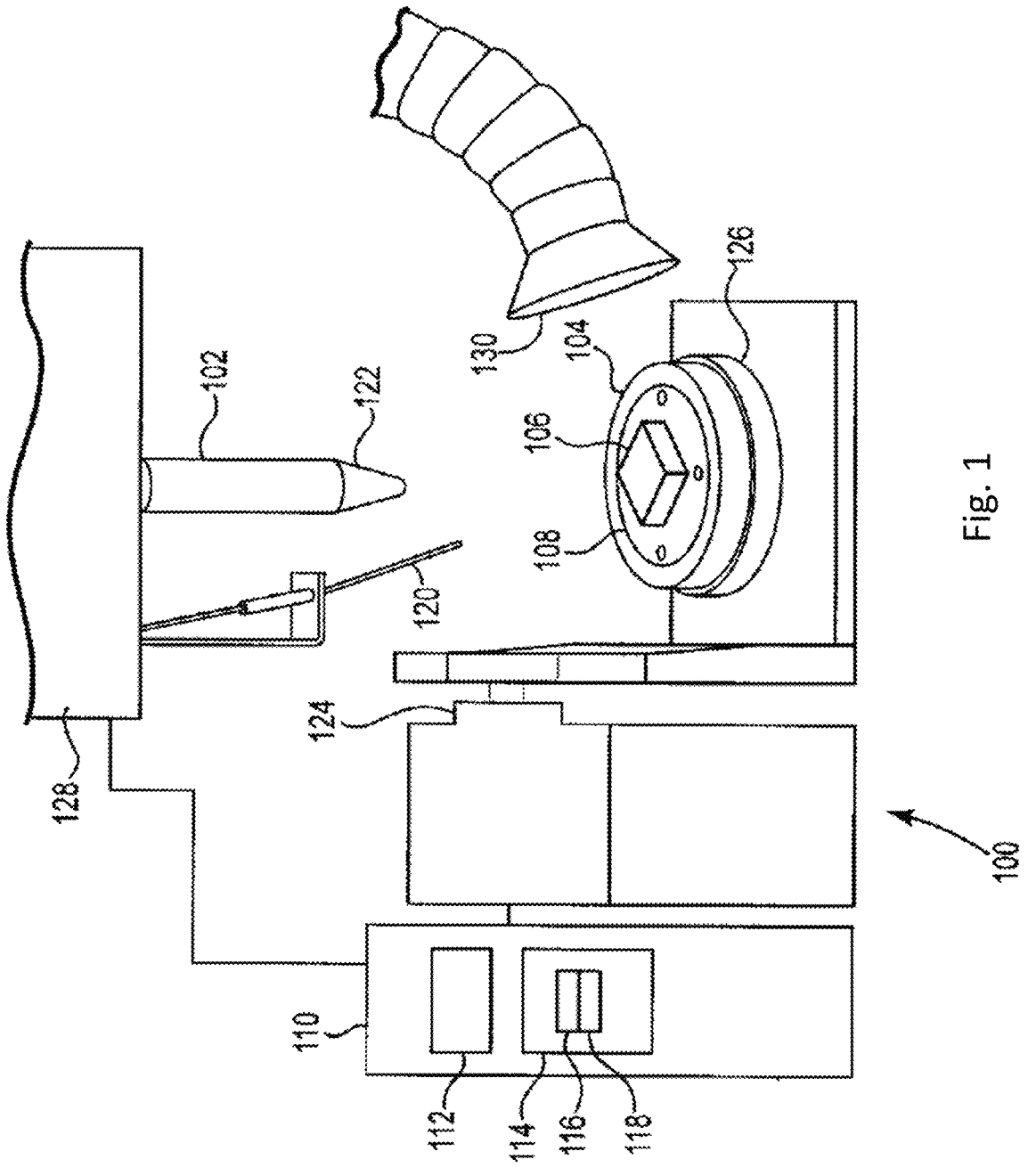
FIG. 1 illustrates a finishing line edge cutting system that can be used in accordance with one or more embodiments of the present disclosure.

The present disclosure relates to dental treatments involving aligners, particularly methods for determining aligner finishing line placement and aligners formed by unique finishing line placement for use during a dental treatment. Improvements in such treatments discussed herein concern the creation and arrangement of the finishing line on aligner devices. As used herein, the finishing edge of an aligner is the edge of the aligner that is farthest away from the occlusal and incisal surfaces.

As discussed above, prior art aligners for orthodontic tooth movements almost always have their finishing edges trimmed in one of two ways; a straight line cut or a scalloped cut. As discussed below, one drawback of the current designs is that, when the finishing line is designed, while most of the aligner will cover the enamel, the finishing edge may terminate on the tooth (enamel, cementum) or gums (gingiva).

The straight line cut aligner edge has several variants. As the name suggests, the finishing edge is cut straight across every tooth (enamel or cementum) and/or gingiva in the arch. The straight finishing line supragingival (above the gumline) to the enamel-gingival or cemento-enamel margin will yield the aligner that is shortest in height. The straight finishing line at the apical aspect of enamel-gingival or cemento-enamel margin will yield the aligner next shortest in height.

In some implementations, a straight finishing line on the gingiva and on the cementum could be used when there is gingival recession present. However, this cut would yield an aligner larger in height. A fourth straight cut option will have the aligner edge completely on the gingiva, slightly beyond the cemento-enamel or cemento-gingival junction, but being straight across, parallel to the jaw line.

The second and more widely used finishing line option is the scalloped cut. The scalloped finishing line follows the contour of each tooth in a semi-circular manner. No gingival tissue is contacted with the scalloped cut.

When aligner treatment progresses to the ideal end of treatment, the:

a. tooth positions improve, b. basal alveolar osseous complex improves, c. health of the gingiva improves.

Improved axial inclinations, root parallelism, Curve of Spee, and Curve of Wilson all contribute to improved 3-D levels of bone. (See U.S. Pat. No. 9,861,451) The improved level, color, thickness, and/or texture of the gingiva and reduced periodontal pocket depth serve to confirm, more clearly than the new occlusion, that the underlying bone has been positively reformulated.

When there are no occlusal interferences and there is improvement to the health of the gingiva, the amount of gingival recession will gradually decrease. As the recession decreases, the gingiva may be stimulated to grow slowly and, on occasion, steadily and significantly approach its pre-recession level.

The gingiva will often become less irritated, show fewer signs of trauma, and appear less maroon/red as it approaches the range of pink shades. Studies report tooth movements projected in simulations are about 77% accurate (range 30%-98%) when compared with actual results. Since all of the aligners in an aligner sequence are designed and often manufactured at the outset of treatment, as treatment progresses, the aligners may become less accurate due, for example, to inaccurate forecasting of gingival height change or inaccurate tooth movement estimation.

For instance, the projected changes to the height of the gingiva are far less predictable than the projected tooth movements within the treatment simulations. That may explain why many digital orthodontic laboratories often omit gingival height projections in their simulations completely, and why they virtually cover cementum, exposed tooth structure, with virtual gingiva. Such omissions may cause the scalloped or straight line current finishing line processes to miscalculate the intended position of the finishing line and will not place the finishing line above the edge of the highest tooth (as anything above that is either not provided or estimated).

While estimating the progression of the height of the gingiva is challenging from a clinical perspective, it is much more difficult to program those expected changes within the software coding.

Distinguishing unhealthy (e.g., inflamed, irritated) gingiva from healthy gingiva is difficult) for intraoral digital scanners and digital scans of analog impressions (e.g., vinylpolysiloxane). Once the gingiva has been virtually augmented to the desired estimated surface in the digital orthodontic simulation, the finishing line option is limited to the scalloped or straight line version with nominal coverage of the gingiva, less than or equal to 0.5 mm.

One problem with reduced coverage of the exposed cementum or subgingival dentin, whether scalloped or straight, is that the reduced aligner height in that area will not be able to supply the ideal tooth moving force to achieve maximum efficacy. When this compromise happens, desired tooth movements may require additional time and/or be less likely to occur, diminishing the likelihood of the desired outcome. So, a tooth with extensive exposed cementum that needs to be prudently moved will receive diminished torque and/or linear force and reduced guidance because the aligner is not providing the most efficient coverage of the root and/or gingiva. Such aligner construction is another reason why attachments are used.

Figure 5:
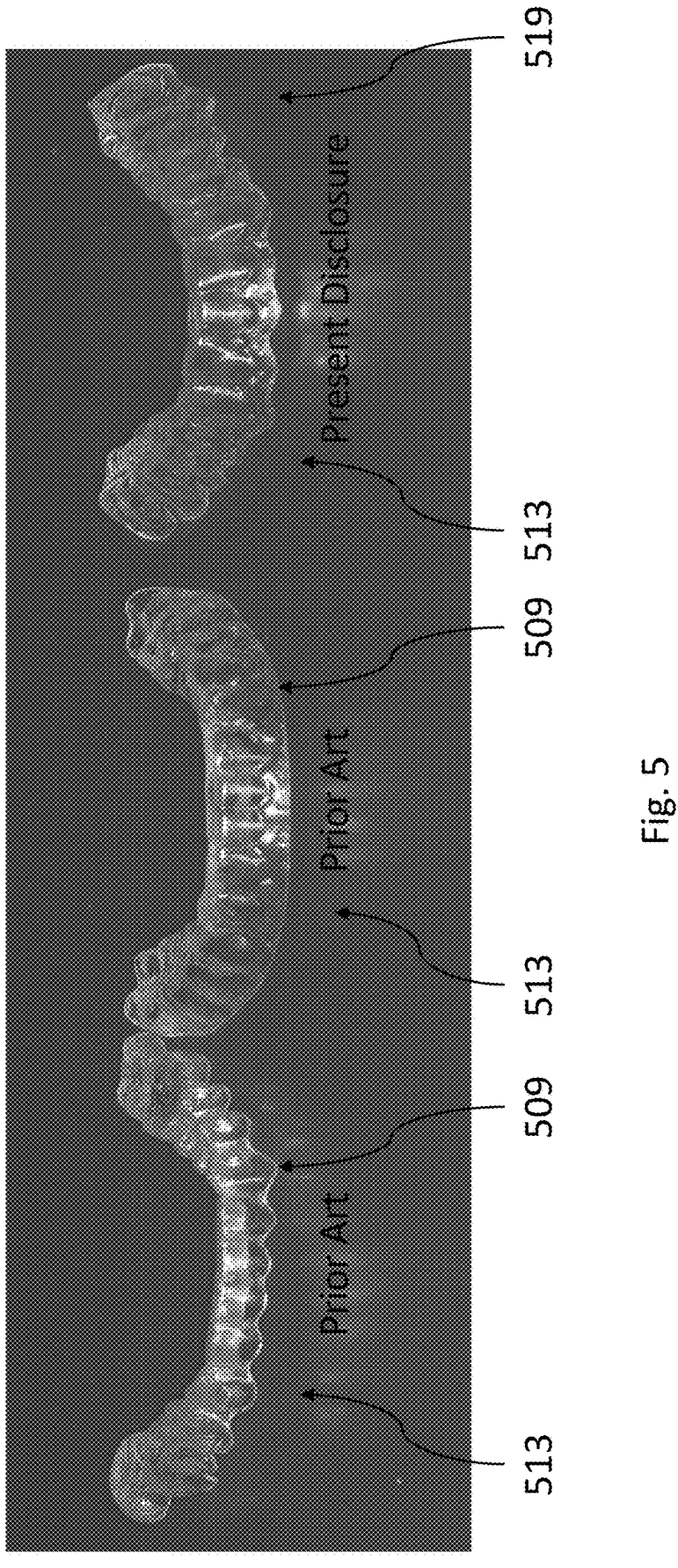
FIG. 5 shows a side-by-side comparison between the prior art scalloped design, the straight line prior art design, and a finishing line cut according to an embodiment of the present disclosure.
Figure 8:
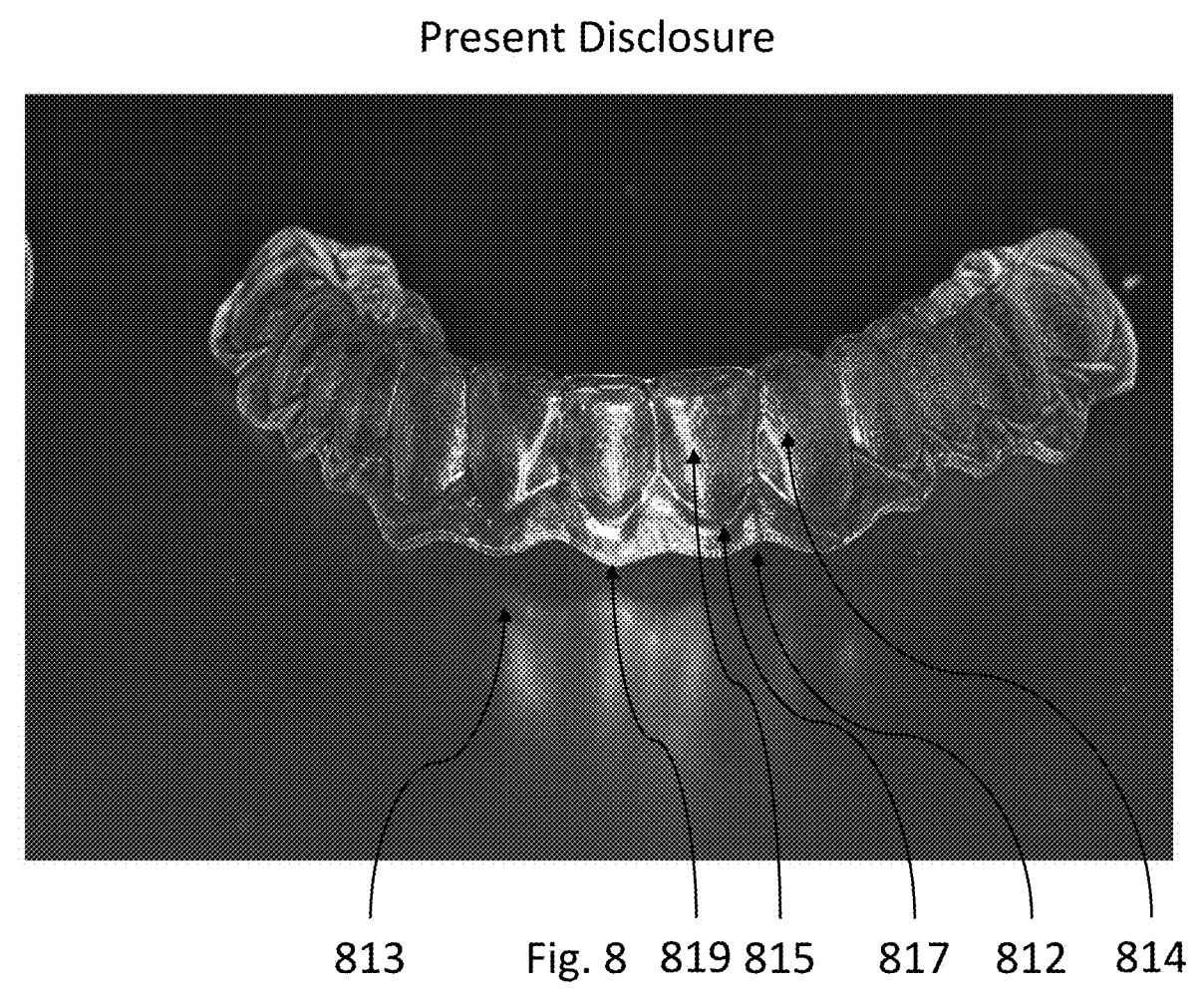

The following charts represent embodiments of the present disclosure. They demonstrate the most efficacious ways to design an aligner to move teeth and provide significant benefits over current aligner methods and configurations. The finishing trim lines are predicated on the location of the gingiva. The ideal trim line is a unique flexible scalloped finishing line completely on the gingiva as shown in FIGS. 5 and 8 (far right-Present Disclosure).

In some embodiments, the focus can be on the minimum gingiva coverage. For example, the minimum gingival coverage when there is no recession can be 1 mm. The minimum gingival coverage when there is recession can be 0.5 mm.

In various embodiments, the focus can be on the maximum gingiva coverage. For example, the maximum gingival coverage when there is no recession can be 2.5 mm. The maximum gingival coverage when there is recession can be 1.5 mm. If atypical muscle frenums are present, those areas will need to be properly accommodated with minor adjustments made to the gingival coverage range.

The connection from one scalloped area to another on the gingiva should follow these coverage guidelines to ensure the aligners perform in a fashion superior to previous straight and scalloped methods. Gingival coverage in excess of 2.5 mm does not appear to add value. The increased size of the aligner may impede the process. It might increase the length of time needed to obtain the desired movements with that set, increase the likelihood of an irritation to the buccal mucosa and/or the tongue or increase the likelihood of that aligner being inadvertently damaged or torn while being inserted or removed.

Trim Line Guidance-Aligner

| Enamel Location in Relation to the Gumline | Placement of Laser Cut | Comment | Comment |
| --- | --- | --- | --- |
| At the gumline | 1-1.25 mm of gum coverage, scalloped to follow the shape of the tooth | | |

-continued

| Enamel Location in Relation to the Gumline | Placement of Laser Cut | Comment | Comment |
|---|---|---|---|
| 1 mm of gum recession or 1 mm of visible cementum | 1-1.25 mm of gum coverage, scalloped to follow the shape of the tooth | | |
| 2-5 mm of gum recession or 2-5 mm of visible cementum | 0.5-1.25 mm away from the gumline, fully on the tooth | Starting with Aligner Set #6, 0.75-1.5 mm away from the starting gumline, fully on the tooth | Starting with Aligner Set #12, 1-2.25 mm away from the starting gumline, fully on the tooth |
| Gumline between teeth | 1.5-2.5 mm of gum coverage | | |
| Gumline between teeth with gum recession on one or both teeth | 2-2.5 mm of gum coverage | | |

The improvement to the patient's health status is achieved through judicious tooth movements that foster a positive reformulation of the basal alveolar osseous process in the maxillary and mandibular arches which possess most, if not all teeth. The reformulation of the supportive bone and improved force distribution during function are a couple of the enhancements which help the tooth/bone/bite relationships reduce asymmetry and increase occlusion stability.

Embodiments of the present disclosure provide minimally invasive bone acceleration surgical therapy (BAST) methods U.S. Pat. No. 11,173,014 and systems that can be combined with conventional orthodontic systems like braces and aligners. In one embodiment, the concept complements the efficacy of the ART ("Arch Reformulation Therapy") method as outlined in U.S. Pat. No. 9,861,451 (incorporated herein by reference). The ART method allows a patient that is otherwise denied orthodontic therapy to be treated with conventional orthodontic treatment systems like braces and aligners. Systems of the present disclosure will also help patients achieve desirable levels of periodontal health and a more stable occlusion.

It has been conventional thinking that not all patients are deemed responsive to treatment with flexible aligners. For example, according to the websites of major manufacturers of orthodontic flexible aligners, the guidelines for a patient who would be deemed unsuitable would have a condition, such as:

1. Any type, method, or movement indicated as difficult.
2. Centric-relation and centric-occlusion discrepancies.
3. Teeth with short clinical crowns.
4. Arches with multiple missing teeth.
5. Patients with poor oral hygiene.
6. Patients with active periodontal disease.
7. Doctor cannot confirm a patient is dentally and periodontally stable
8. Patients with multiple dental prosthetics or implants.

Embodiments of the present disclosure can be used on the above conditions that conventionally have not been suitable for aligner treatment.

Another issue, with conventional and removable aligner orthodontic therapy, is relapse. Relapse means that, after the conclusion of orthodontic treatment teeth move away from their newly desired positions and move to undesirable maloccluded states. For well more than a century, there has been rampant speculation as to the clinical and patient management reasons for relapse. Presently, none of the post-active therapy retention methods have yielded a successful method to avoid relapse or overcome the potential for relapse.

However, it is theorized herein by the inventor of the present embodiments, that relapse occurs because standard orthodontic therapy involving tooth repositioning does not properly align the teeth to a sufficient standard where the supportive osseous substructure achieves maximum reformulation. That may further explain why standard orthodontic therapy has not been able promote the achievement of healthier gingiva and considers an unhealthy or unstable gingival state to be a contraindication for traditional or aligner orthodontics.

The efficacy of a method according to the present disclosure may be judged by evaluating the health of the patient's gingiva during each phase of treatment. The following summarizes a qualitative scale for the evaluation of the gingival health of a patient who is receiving treatment according to embodiments of the present disclosure.

Level I of Gingival Health has been achieved when, compared to a state prior to the initiation of the treatment (first described in U.S. Pat. No. 9,861,451):
    1) the overall appearance of the gingiva is improved;
    2) the gingiva is less inflamed;
    3) the gingiva is less red.
Level II of Gingival Health has been achieved when, compared to Level I:
    1) the overall appearance of the gingiva has improved;
    2) the gingiva is less inflamed;
    3) the gingiva is less red;
    4) the gingiva has started to mature (is more robust and has become thicker).
Level III of Gingival Health has been achieved when, compared to Level II:
    1) the overall appearance of the gingiva has improved;
    2) the gingiva is less inflamed;
    3) the gingiva is less red;
    4) the gingiva has stopped receding or has started to have evidence of growth;
    5) the gingiva has maintained a prior level of robustness, of maturation, or has further matured.

Further improvement to the health of the patient's gingiva can be determined based on the appearance of the gingiva. Preferably, photographic records of the gingiva obtained throughout the process in addition to traditional periodontal probing will help the clinician determine whether a Gingival Health Level within the regimen has been achieved.

In conventional orthodontic therapies, the health of the gingiva is not considered a primary indication of the need to initiate orthodontic therapy. Further, presently, the health of the gingiva is not a criterion used to determine whether standard orthodontic therapy was successful at the conclusion of treatment. See *The American Board of Orthodontics Grading System for Dental Casts and Panoramic Radiographs*, pp. 5-17, March 2011. Additionally, the health of the gingiva is presently not a criterion used to determine whether orthodontic relapse has occurred.

In conventional orthodontic therapies, if a patient presents with active periodontal disease and/or pronounced gingival recession, proceeding with orthodontic therapy is contraindicated. Only after a periodontist or general dentist certifies that the periodontal health of the patient is sufficiently stable to withstand orthodontic therapy will treatment be initiated. According to one aspect of embodiments of the present disclosure, active periodontal disease is an indication, not a contraindication, to the initiation of therapy.

As will be understood by a skilled person upon review of the disclosure, the health of the gingival tissue is a significant indicator of malocclusion, especially chronic malocclusion that will require intervention and correction by an orthodontist, general dentist, periodontist, prosthodontist, or pediatric dentist.

With regard to dental tray embodiments, the application of substances, such as medicaments to the teeth/gingiva/crevicular fluid, will be successful when those medicaments stay in contact with their intended locations for a prolonged period. Embodiments of the present disclosure can provide this because the trays of the present disclosure completely cover ~2 mm of the gingiva. Accordingly, when, for example, oral antiseptic solutions (e.g., 2-3% hydrogen peroxide [HP] or 6-10% carbamide peroxide [CP] whitening solutions) are utilized, there is far greater efficacy of the application than with prior art designs that do not have uniform (magnitude and consistency) gingival coverage.

In the embodiments of the present disclosure, there is no need to create a "peripheral seal" at the edge of each aligner to ensure that at a minimally sufficient, and preferably most desirable amount of solution reaches subgingivally without most of the medicament leaking out of the aligner. That is why the gingival coverage of prior embodiments requires a far less common, more viscous solution to help the medicament remain in the cavities (intaglio) of the tray, and in contact with the crevicular fluid.

Previous designs were straight line designs and created a peripheral seal to keep the substances in the tray by adapting the tray to include a minor score (small concavity along the edge) on the physical/digital model. The result was a beaded ridge on the tray that allows it to slightly "dig in" to the gingiva. While this will purportedly keep the substance in contact with, for example, the crevicular fluid between the tooth and gingiva, it could be uncomfortable to the patient.

Accordingly, the embodiments of the present disclosure help to facilitate and ensure that the health of the gingiva is maintained or improved throughout the course of care and since the trays of the present disclosure are scalloped, evenly covering the gingiva, they ensure it will be a more comfortable and superior fit. That will increase the ease of use and likelihood of patient compliance. One reason for this superior fit is that, unlike the straight fit ridged designs, the embodiments of the present disclosure do not have wide (0-4 mm) variances of gingival coverage, which lead to discomfort due to a less than optimum fit on the patient's jaw (gums)/teeth.

Additionally, this more consistent gingival coverage obviates the need to increase the viscosity of a HP/CP solution to counteract the likelihood of leakage with the prior art. That increase in viscosity is necessary to overcome the shortcomings inherent within the current design. Another benefit/result of the present embodiment is that a wide, not a narrow array of oral antiseptic viscosities, will yield desirable and successful results.

Provided below is a description of an example aligner cutting machine and descriptions of prior art aligners and aligners of the present disclosure. In the following portion of the detailed description, reference is made to the accompanying figures that form a part hereof. The figures show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

Also, as used herein, "a" or "a number of" something can refer to one or more such things. For example, "a number of teeth" can refer to one or more teeth.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

FIG. 1 illustrates a finishing line edge cutting system that can be used in accordance with one or more embodiments of the present disclosure. This is just one example system that could be utilized, and the reader should note that other suitable laser and non-laser systems can be used.

In the embodiment illustrated in FIG. 1, the system 100 is provided for laser cutting an aligner from a piece of material, for example, formed over a mold 106. The laser could also be used to trim parts that have excess portions that need to be trimmed off the part before they are shipped to a client. As used herein, a part is a piece of material that will be cut from a larger piece of material to create an aligner through the laser cutting process that cuts pieces of the part off to, for example, form a finishing line edge. Some embodiments could be 3D printed in which the finishing line is formed by instructions sent to the printer.

The system 100 of FIG. 1 includes a laser generating component 102, one or more optical components 122, a fixture 104, and a mold 106 positioned on the fixture 104. In the embodiment of FIG. 1, the fixture also includes a platform 108 for positioning the mold 106 thereon and a rotating mechanism 126 that allows the part or mold with a part on it to rotate in a clockwise and/or counterclockwise direction when viewed from above the platform.

In the embodiment of FIG. 1, the system 100 also includes a control component 110. The control component 110 includes a processor 112, memory 114, and one or more control mechanisms 124, 126, and/or 128. Instructions 116 can be stored in the memory 114 and executed by the processor 112 to control, for example, movement of the fixture 104 holding the part, movement of the laser generating component 102, movement of one or more of the optical components 122, adjustment of one or more characteristics of the laser beam generated by the laser generating component 102, adjustment of the characteristics of a gas applied via nozzle 120 and/or other characteristics of a suction applied via tube 130. The control component functions can be utilized to define the cut line used to form the edges of the aligner, such as the finishing line edge.

These items can be controlled, for example, via control components 124, 126, and/or 128 and/or via mechanisms provided to adjust one or more optical components 122, adjust characteristics of the laser generating component 102, adjust characteristics of a gas provided via nozzle 120, and/or adjust suction pressure provided via suction tube 130. Memory 114 can also have data 118 stored therein that can be used in executing the instructions as will be discussed in more detail below.

Memory can be a non-transitory machine readable medium that provides volatile or nonvolatile memory. The memory can also be removable, e.g., portable memory, or non-removable, e.g., internal memory. For example, the memory can be random access memory (RAM) or read-only memory (ROM).

Memory can, for example, be dynamic random access memory (DRAM), electrically erasable programmable read-only memory (EEPROM), flash memory, phase change random access memory (PCRAM), compact-disk read-only memory (CD-ROM), a laser disk, a digital versatile disk (DVD) or other optical disk storage, and/or a magnetic medium such as magnetic cassettes, tapes, or disks, among other types of memory.

Further, although memory is illustrated as being located in a control mechanism 110, embodiments of the present disclosure are not so limited. For example, memory can also be located in a memory device that is not a control mechanism but is connected to the control mechanism. In some embodiments, the memory can be internal or external to a computing resource and can enable machine readable instructions to be uploaded and/or downloaded over a network, such as the Internet, or another wired or wireless connection.

The control component 110 can include a laser power adjustment control. The control component 110 can include an optics control that adjusts a position of one or more of the number of optical components. A single control component can be utilized to control all of the above functionalities, or these functionalities can be controlled by multiple components (e.g., processors). In some embodiments, the speed of the part at the cutting position relative to the laser beam at the cutting position can be maintained substantially constant while the part is movable in at least three axes of movement. In various embodiments, the control component can adjust the speed of the fixture such that the laser energy vaporizes all material of the part at each point along the cut path on the part while maintaining the integrity of the support.

In some embodiments, the control component for adjusting the laser energy provides a mechanism for adjusting at least one of laser generating component power, laser generating component movement, optical component type, optical component movement, fixture movement, gas type, gas pressure, gas temperature, and suction such that a ratio of a laser energy applied to the part and a part material thickness is maintained within a predetermined acceptable range.

The control mechanisms that are used to adjust the various components of the system can be any suitable mechanisms. For example, they can be electrical and/or mechanical actuators that move one component with respect to another component of the system 100. For example, in the embodiment of FIG. 1, control mechanism 128 can be used to move the laser generating component 102, optical component 122, and gas nozzle 120 closer or farther with respect to the platform 108 and thereby closer to or farther from the mold 106.

Such movements can change the characteristics of the laser beam generated, how the optics interact with the beam generated, and the gas applied. In some embodiments, the nozzle 120, optical component 122, and laser generating component can each be moved independently with respect to each other.

Control mechanism 124 can, for example, be a mechanical actuator that moves the fixture in a number of directions. For example, in the embodiment of FIG. 1, the mechanism 124 can move the part horizontally with respect to the laser generating component 102 and can also rotate the fixture 104 clockwise and/or counterclockwise when viewed from the side of the platform 104 (e.g., from the perspective of the suction tube 130 of FIG. 1). In the embodiment of FIG. 1, the combination of the movements of mechanism 124 and those of mechanism 126 allow the fixture to be moved in five axes of motion with respect to the laser generating component 102 as will be discussed in more detail below.

In one or more embodiments, the fixture for handling the part can, for example, include a robot suction and/or pincher mechanism to secure and/or move the support and/or part during the laser cutting process. As illustrated in FIG. 1, in some embodiments, the system can include one or more gas nozzles (e.g., nozzle 120) which dispense gas or suck gas in. In various embodiments, the one or more nozzles can be directed at a point at which the laser energy contacts the part. The gas can be any suitable type of gas including chilled, heated, and/or room temperature gas (e.g., one type for one nozzle and another type from another nozzle). Examples can include air, oxygen, and/or nitrogen, among others.

This can be beneficial for a number of reasons. For example, gas can be used to heat or cool the part, dissipate heat generated from the laser, change the chemical composition of the gas (e.g., air) at the area of the cut, and/or suck or blow away debris from the cut path if it is not vaporized from the cutting process, among other benefits.

In various embodiments, the area affected by the heat can be reduced depending upon the direction in which the gas and laser beam are oriented. For example, the area of heat effect may be reduced when the laser beam is traveling in line with the directed gas and may increase when traveling across the path of the gas exiting from the tip of the nozzle.

In some embodiments, a nozzle is located at a location remote from the laser generating component and at an angle to a direction of a laser beam that directs the laser energy toward the part. Such an embodiment is illustrated in FIG.

1, where the nozzle 120 is oriented at an angle to the laser beam generated by the laser generating component 102. This can be beneficial, in some embodiments, for example, because the gas can be used to blow away the debris from the cut path area.

Other benefits include: the surface of the cut being improved as well as clouding from the cutting process being reduced through use of blowing a gas at moderate velocity. This can, for example, move heavy particles created by the cutting process away from the cut edge, among other benefits.

Nozzles can have various shapes and sizes based upon the application in which it is used. For example, the inner diameter of a nozzle, nozzle tip angle, overall angle of a nozzle to the cut location, and nozzle tip shape can be adjusted.

In some embodiments, the system includes a suction mechanism 130 located proximate to where the laser energy contacts the part to remove debris created when the laser energy contacts the part. For example, one such embodiment is illustrated in FIG. 1. This can be beneficial, in some embodiments, for example, because the suction mechanism (e.g., suction tube 130) can be used to suction away the debris from the cut path area, among other benefits. This can be used in combination with one or more nozzles which, in some instances, can better remove debris from the area, for example, by blowing the debris toward the suction mechanism.

Figure 2:
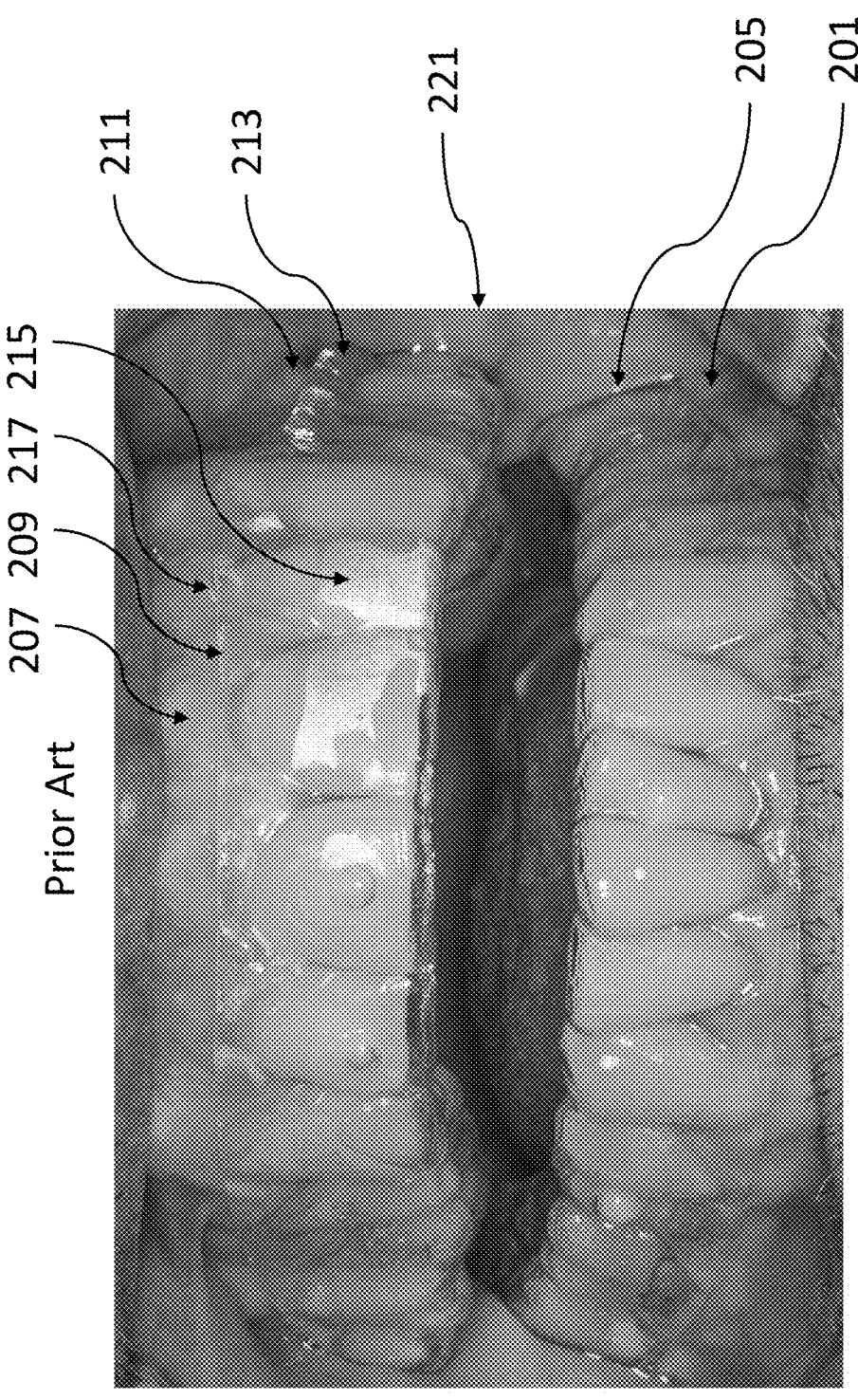
FIG. 2 shows a straight line cut design finishing line of the prior art showing typical positioning of the finishing line.

FIG. 2 shows a straight line cut design finishing line of the prior art showing typical positioning of the finishing line. FIG. 2 shows a patient's mouth 221 having a bottom jaw 201 with an aligner 205 placed thereon and a top jaw 211 with an aligner 213 placed thereon. Identified in FIG. 2 are a tooth 215, in contact with the gingiva 207 (also called gum), and a tooth-gingiva interface 217 where the tooth and gingiva are adjacent to each other. As used herein, the tooth-gingiva interface is on the front of the patient's teeth, where a surface of an aligner will be in contact.

FIG. 2 also shows a finishing line 209 of the aligner that is cut at a manufacturing facility. As used herein, the finishing line is the edge of the aligner that will be positioned on the front of the patient's teeth. In this example of a prior art aligner, the finishing line is a straight cut line (i.e., it does not follow the contours of the teeth as the scalloped design does in FIG. 4). This straight cut line can be an easier aligner to fabricate as once the height from the lower tip of the teeth is determined, a straight cut line can be defined, and the cutter can simply cut along that line during manufacturing.

Figure 3:
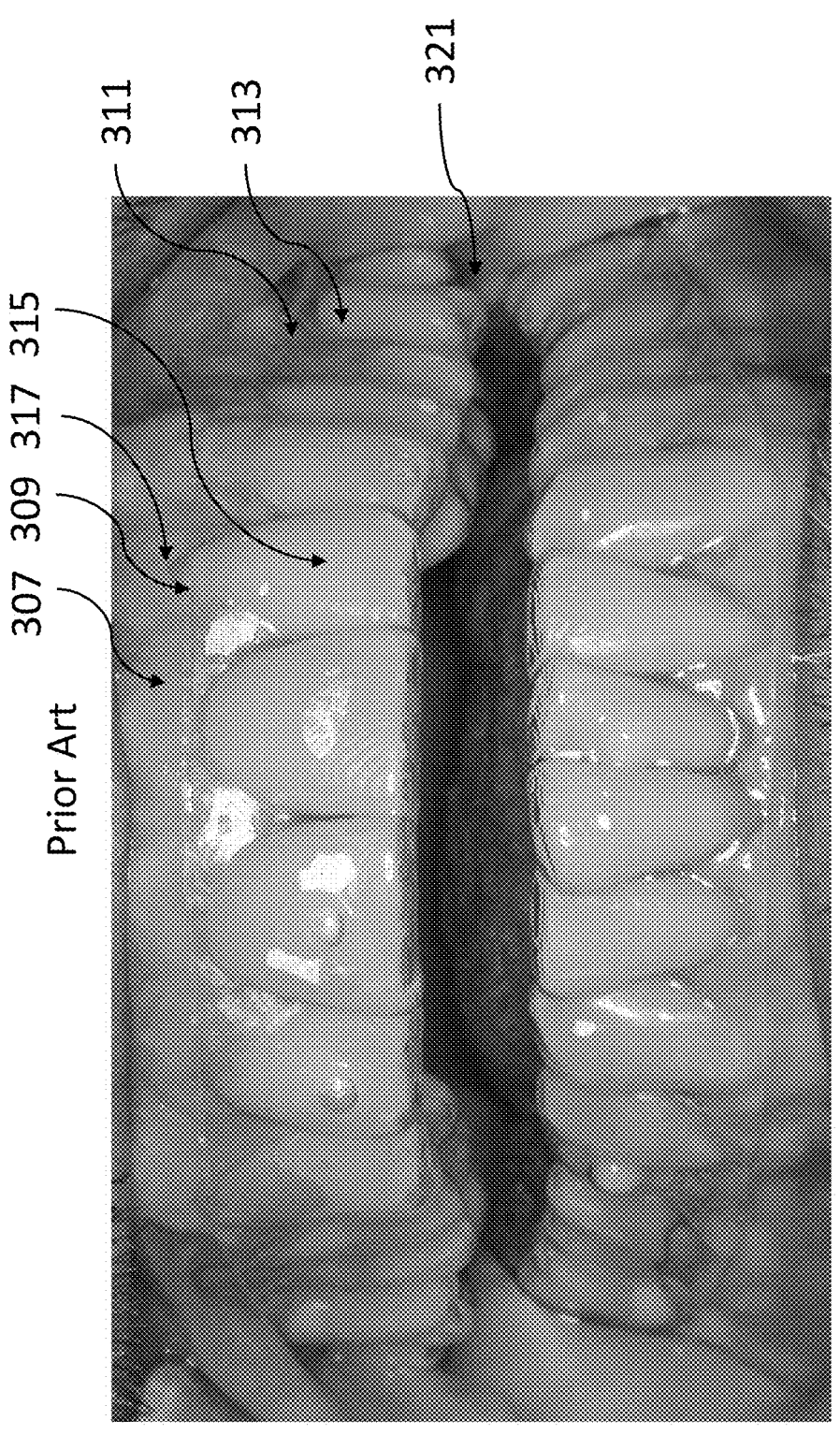
FIG. 3 shows a straight line cut design finishing line of the prior art showing an under-positioning of the finishing line.

In order to cover the entirety of the front surfaces of the teeth on jaw 211, the determined finishing line height must be above all of the tooth-gingiva interfaces. In the example of FIG. 2, the height from the lower tip of the teeth is determined to be at the tooth-gingiva interface 217 and the finishing line is a straight line at that height. Tooth-gingiva interface 217 is the highest interface on jaw 211. Identifying the height may be problematic as scanning software used to create the data sets for determining these heights may not clearly delineate the tooth-gingiva interfaces. FIG. 3 represents one example of such an error.

FIG. 3 shows a straight line cut design finishing line of the prior art showing an under-positioning of the finishing line. Here, again, FIG. 3 shows a patient's mouth 300 having a top jaw 311 with an aligner 313 placed thereon. Identified in FIG. 3 are a tooth 315, in contact with the gingiva 307, a tooth-gingiva interface 317 where the tooth and gingiva are adjacent to each other, and a finishing line 309.

In this example, the computing device that determines the finishing line height under-positioned the finishing line height that leaves a portion of the tooth 315 not covered by the aligner. Specifically, the tooth-gingiva interface 317 is above the finishing line 309. Such errors can occur in both straight and scalloped implementations in the prior art. Such configurations can be detrimental to gingiva health as it is theorized herein that completely covering the tooth-gingiva interface improves gingiva health at that location.

Figure 4:
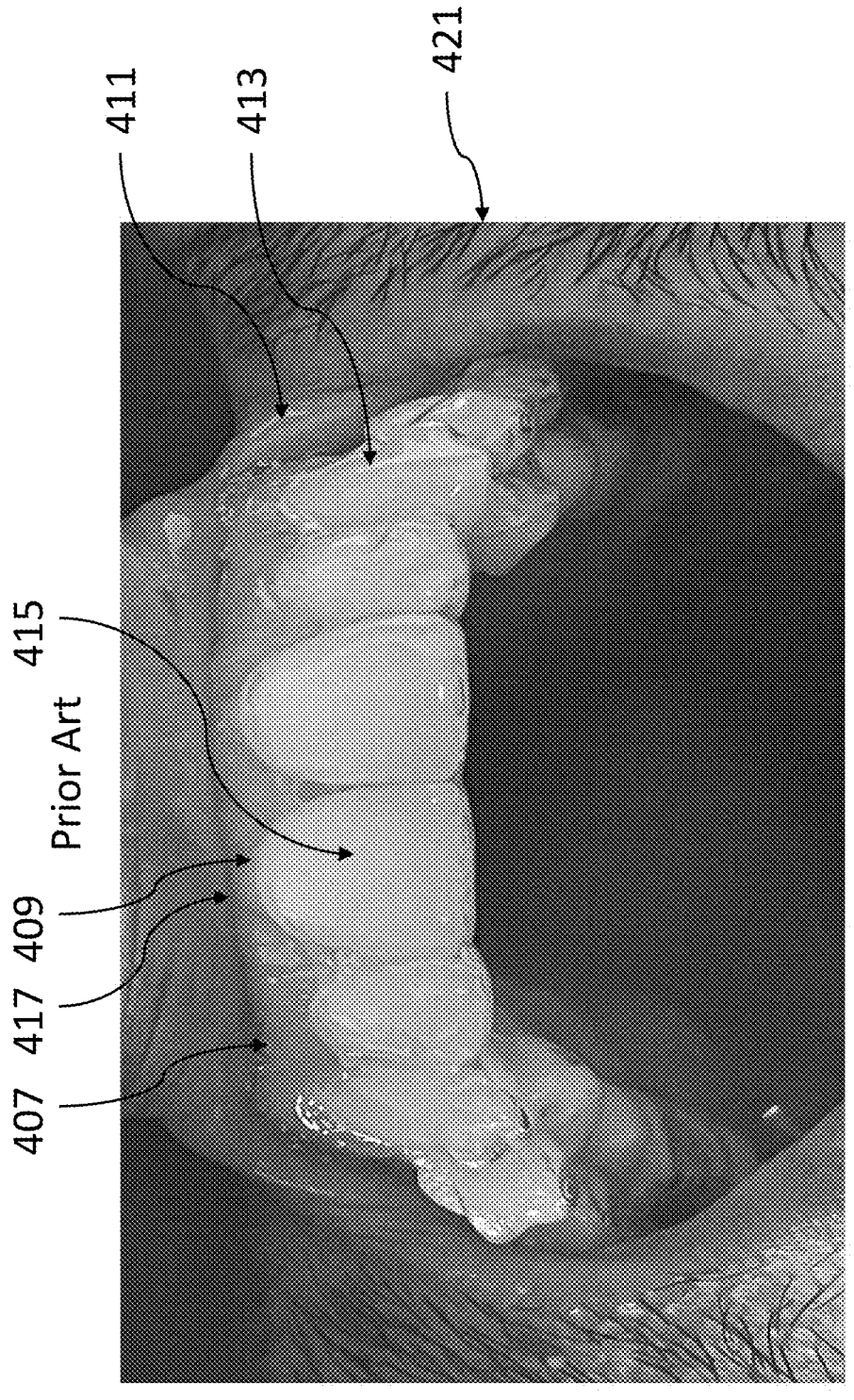
FIG. 4 shows a scalloped cut design finishing line of the prior art showing under-positioning of the finishing line.

FIG. 4 shows a scalloped cut design finishing line of the prior art showing under-positioning of the finishing line. FIG. 4 shows a patient's mouth 400 having a top jaw 411 with an aligner 413 placed thereon. Identified in FIG. 4 are a tooth 415, in contact with the gingiva 407, a tooth-gingiva interface 417 where the tooth and gingiva are adjacent to each other, and a finishing line 409. Here again, the tooth-gingiva interface 417 is above the finishing line 409. This could be due to incorrect analysis of the scan data set, unclear tooth-gingiva interface data, and/or recession of the gingiva since the scan data set was created. This exposes the tooth-gingiva interface 417 and the top of the tooth 415.

FIG. 5 shows a side-by-side comparison between the prior art scalloped design, the straight line prior art design, and a finishing line cut according to an embodiment of the present disclosure. FIG. 5 shows three aligners 513, with a scalloped finishing line 509 prior art aligner on the left, a straight finishing line 509 prior art aligner in the middle, and an aligner with an offset finishing line 519 created according to an embodiment of the present disclosure on the right. As can be seen from this comparison, the offset finishing line allows for much taller surfaces that contact the teeth and gingiva rather than just the teeth. This provides the "wrap around" functionality discussed elsewhere in this disclosure which provides more force and more accurate force distribution than the scalloped prior art aligner.

Further, the comparison also indicates that the tooth-gingiva interfaces and gingiva surfaces are accurately depicted in the surface of the aligner, which provides a more comfortable fit than the straight line aligner which estimates those surfaces, and allows them to more robustly and accurately impart force.

Figure 6:
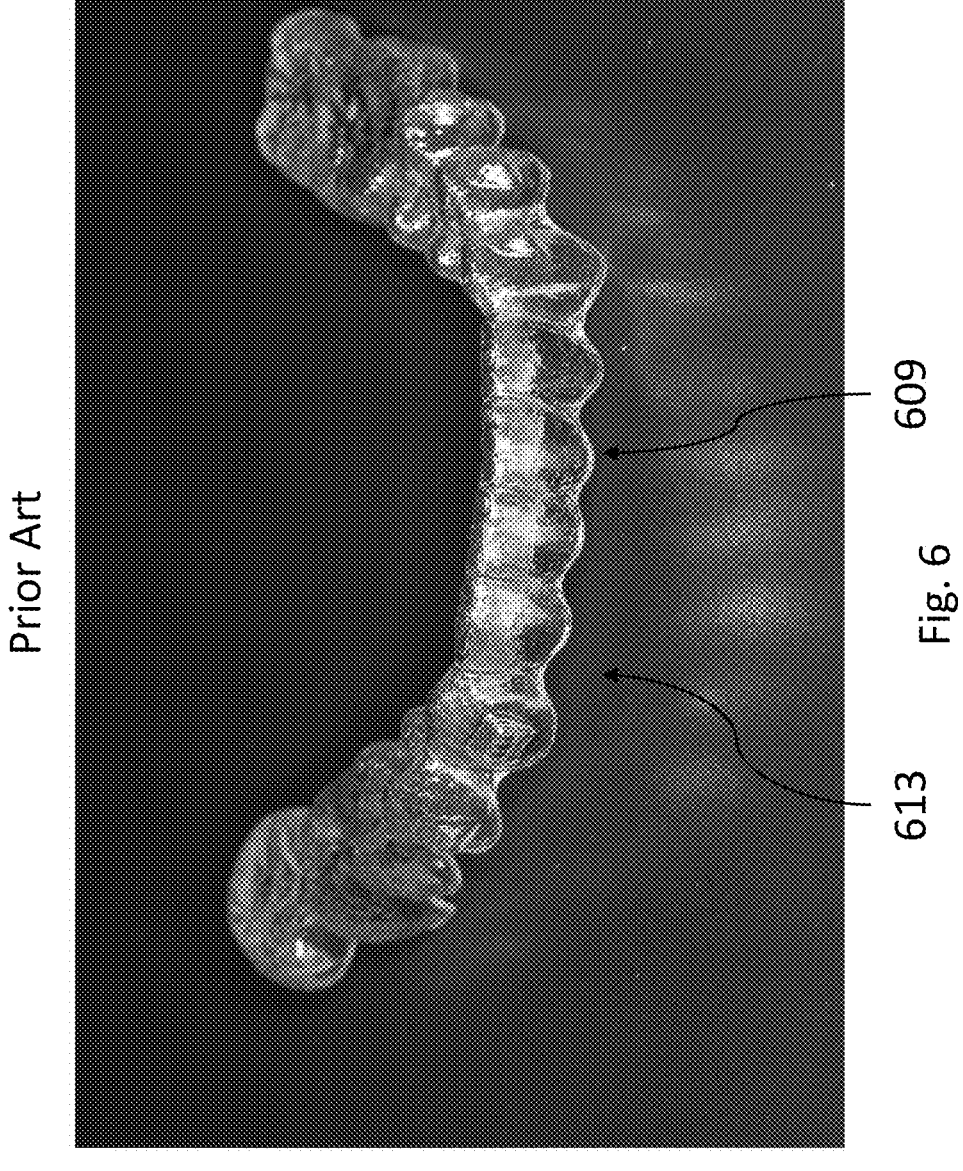
FIG. 6 shows a close up of the scalloped cut design finishing line of the prior art showing typical positioning of the finishing line of FIG. 5.

FIG. 6 shows a close up of the scalloped cut design finishing line of the prior art showing typical positioning of the finishing line of FIG. 5. As can be seen from this illustration, prior art aligner 613 is much shorter than the offset aligner shown in FIG. 8. Accordingly, the aligner in FIG. 6 will likely have to be used with additions to the teeth (e.g., attachments, engagers, bumps) to provide enough force to move teeth and will likely be designed to impart maximum force early in its lifespan as the lifespan may be short due to its construction. Its finishing line 609 will also not protect the tooth-gingiva interface or the gingiva which may reduce or prohibit decreasing gingival recession and gingiva health, generally.

Figure 7:
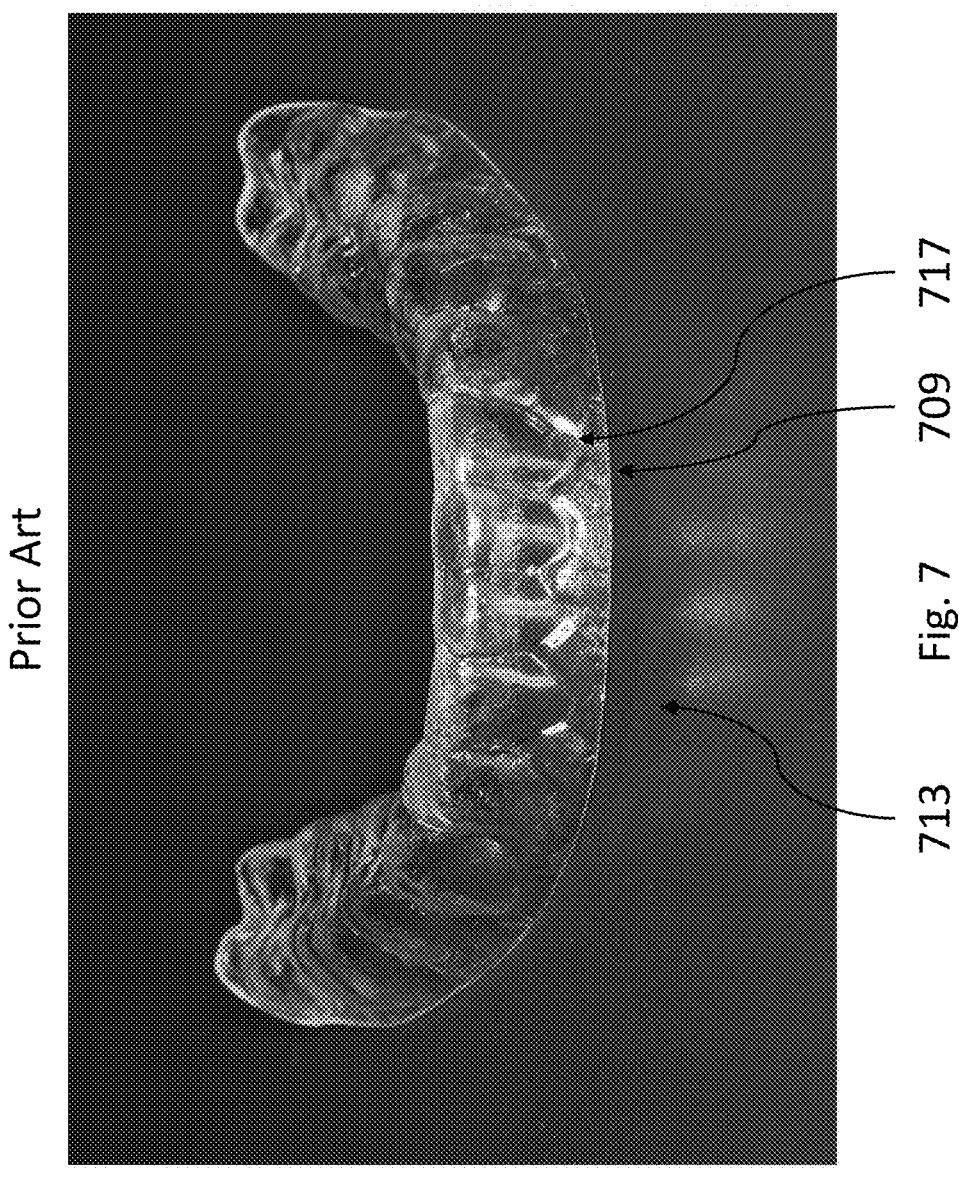
FIG. 7 shows a close up of the straight line cut design finishing line of the prior art showing typical positioning of the finishing line of FIG. 5.

FIG. 7 shows a close up of the straight line cut design finishing line of the prior art showing typical positioning of the finishing line of FIG. 5. Here you can see that the finishing line 709 of the aligner 713 is a straight cut and does not follow the contours of the gingiva. Also, the portion of the aligner between the finishing line 709 and the tooth-gingiva interface 717 has no contours to match the surface of the gingiva or the contours of the tooth-gingiva interface 717. Such a design would be uncomfortable for the patient and provide less opportunity for improving gingiva health as this aligner may have little contact with the gingiva or tooth-gingiva interface due to its inaccurate surface shape. It is not uncommon for the gingival coverage of the teeth in the same arch to range from −3 mm (supragingival, where a tooth possesses gingival recession) to 4 mm within the aligner. Clearly, a 7 mm deviation for the tooth/gingival coverage could not possibly be providing the most prudent delivery force for each and every desired movement within the arch during that stage.

FIG. 8 shows a close up of the cut design finishing line according to an embodiment of the present disclosure of FIG. 5. This aligner 813 includes a finishing line 819 having an offset that moves the finishing line away from the tooth-gingiva interface 817 and onto the gingiva. In order to accomplish this, the software used with the intraoral scanner is reconfigured to collect tooth-gingiva interface and gingiva data and that more robust scan data is used to model the tooth-gingiva interface for each tooth that will interact with the aligner as well as the surrounding gingiva surfaces, such as the area 812 between the spaces for adjacent teeth 814 and 815. These surrounding gingiva surfaces 812 can thereby also be accurately modeled and the aligner formed with surfaces to fit those surfaces.

Various method, device, and system embodiments are advanced in the present disclosure. For example, one method embodiment for determining a finishing line of a dental aligner, the method includes: receiving intraoral scan data including data for at least one jaw of a patient and having data for multiple teeth on the at least one jaw and gingival surfaces surrounding the teeth; creating a three dimensional (3D) virtual model of the teeth and gingival surfaces surrounding the teeth based on the intraoral scan data; determining a tooth-gingiva interface between each tooth and the gingiva and surface shape of the gingiva between adjacent teeth based on the based on the intraoral scan data; receiving camera image data including data for the at least one jaw of a patient and having data for the multiple teeth and gingival surfaces surrounding the teeth included in the intraoral scan data; confirming or adjusting the locations of the tooth-gingiva interface between each tooth and the gingiva and the surface shape of the gingiva between adjacent teeth based on the camera image data to create an updated 3D model; and determining a finishing cut line based on the 3D model and whether the scan data or image data indicate gingival recession.

In some embodiments, the finishing cut line 813 has an offset from the determined tooth-gingiva interface 811. In various situations, the finishing cut line offset can be different at a particular determined tooth-gingiva interface if gingival recession is present at the particular determined tooth-gingiva interface between each tooth.

The finishing cut line has an offset from a closest point to an adjacent tooth of the surface shape of the gingiva between adjacent teeth, such as at 812 between tooth apertures 814 and 815 in the aligner. In some embodiments, the finishing cut line offset is different at the closest point to an adjacent tooth of the surface shape of the gingiva between adjacent teeth if gingival recession is present at the closest point to an adjacent tooth of the surface shape of the gingiva between adjacent teeth. In some such embodiments, the finishing cut line offset is different at a particular determined tooth-gingiva interface if gingival recession is present at the particular determined tooth-gingiva interface.

As shown in FIG. 8, some embodiments have a finishing cut line with offsets from the determined tooth-gingiva interface between each tooth and a closest point to an adjacent tooth of the surface shape of the gingiva between adjacent teeth. In some implementations, the finishing cut line offset is different at the particular determined tooth-gingiva interface or from the closest point to an adjacent tooth of the surface shape of the gingiva between adjacent teeth if gingival recession is present at the particular determined tooth-gingiva interface. And, in various embodiments, the finishing cut line has offsets from the determined tooth-gingiva interface between each tooth and a closest point to an adjacent tooth of the surface shape of the gingiva between adjacent teeth and wherein the finishing cut line offset is different at the particular determined tooth-gingiva interface from the offset at the closest point to an adjacent tooth of the surface shape of the gingiva between adjacent teeth.

As provided below is an example of a device embodiment. In this example, a dental aligner design device, includes: a processor; and memory, having instructions stored thereon that are executable by the processor to: receive intraoral scan data including data for at least one jaw of a patient and having data for multiple teeth on the at least one jaw and gingival surfaces surrounding the teeth; create a three dimensional (3D) virtual model of the teeth and gingival surfaces surrounding the teeth based on the intraoral scan data; determine a tooth-gingiva interface between each tooth and the gingiva and surface shape of the gingiva between adjacent teeth based on the based on the intraoral scan data; receive camera image data including data for the at least one jaw of a patient and having data for the multiple teeth and gingival surfaces surrounding the teeth included in the intraoral scan data; confirm or adjust the locations of the tooth-gingiva interface between each tooth and the gingiva and the surface shape of the gingiva between adjacent teeth based on the camera image data to create an updated 3D model; determine a finishing cut line based on the 3D model and whether the scan data or image data indicate gingival recession; form an aligner from the updated 3D model; and cut the formed aligner along the finishing cut line. The device can, for example, be a specialized aligner designing computing device, an aligner production computing device connected to aligner production equipment, an aligner cutting device (e.g., that shown in FIG. 1), or another suitable computing device. The formed aligner can be cut with an aligner cutting machine such as a laser cutter, a mechanical cutter, or any other suitable cutter for cutting the formed aligner from the excess formation material.

In some embodiments, the finishing cut line has an offset of 0.5 mm-2.5 mm from the determined tooth-gingiva interface. In such an embodiment, if gingival recession is present at the particular determined tooth-gingiva interface, the finishing cut line offset is 0.5 mm-1.5 mm at a particular determined tooth-gingiva interface. Further, if no gingival recession is present at the particular determined tooth-gingiva interface, the finishing cut line offset is 1 mm-2.5 mm at a particular determined tooth-gingiva interface.

Additionally, in various embodiments, the finishing cut line has an offset of 2 mm-2.5 mm from a closest point to an adjacent tooth of the surface shape of the gingiva between adjacent teeth. Also, in some embodiments, the finishing cut line has an offset and the finishing cut line offset is different at a first particular determined tooth-gingiva interface than at a second particular determined tooth-gingiva interface tooth. Additionally or alternatively, the finishing cut line has an offset at a particular determined tooth-gingiva interface that is different than an offset of a closest point to an adjacent tooth of the surface shape of the gingiva between adjacent teeth.

Provided below is an example of a tangible machine readable medium embodiment. In this example, the medium includes instructions stored in memory and executable by a processor to perform a method for determining a finishing line of a dental aligner, the method includes: receiving intraoral scan data including data for at least one jaw of a patient and having data for multiple teeth on the at least one jaw and gingival surfaces surrounding the teeth; creating a three dimensional (3D) virtual model of the teeth and gingival surfaces surrounding the teeth based on the intraoral scan data; determining an interface between each tooth and the gingiva and surface shape of the gingiva between adjacent teeth based on the based on the intraoral scan data; receiving camera image data including data for the at least one jaw of a patient and having data for the multiple teeth and gingival surfaces surrounding the teeth included in the intraoral scan data; confirming or adjusting the locations of the interface between each tooth and the gingiva and the surface shape of the gingiva between adjacent teeth based on the camera image data to create an updated 3D model; determining a finishing cut line based on the 3D model and whether the scan data or image data indicate gingival recession; forming an aligner from the updated 3D model; and cutting the formed aligner along the finishing cut line. The tangible machine readable medium can be any suitable medium that can be used by a computing device to execute instructions to perform the method stored on the medium.

In some embodiments, the method includes providing a user input interface and wherein the user confirms or adjusts the locations of the interface between each tooth and the gingiva and the surface shape of the gingiva between adjacent teeth by creating marker data that is used to create the updated 3D model having a confirmed or updated finishing cut line. Further, the method can include converting the finishing cut line on the 3D model into cutting instructions for an aligner cutting machine to cut the formed aligner along the finishing cut line.

These uniquely constructed aligners can be produced in complete sets for use as a dental treatment plan to move teeth from a starting position to a finished position or can be utilized as needed during a treatment plan (e.g., aligners #6-#10 of a 25 aligner treatment plan set). These can also be used to fabricate and are particularly helpful with the manufacture of tinnitus-focused aligners which are intended to reduce existing symptomology and prevent the onset of symptoms from tinnitus.

As discussed above, the aligners of the present disclosure can be manufactured from medical grade polyurethane/co-polyester or PET-G (Polyethylene terephthalate glycol) or other medical grade plastic-like materials and polymers for dental aligner use. This is typically a stronger material which can be beneficial to improve the length each aligner (e.g., sixty days versus two weeks for current aligners) can be used and provide added force than current aligner materials, among other benefits. This can allow the aligner to be used without attachments and can allow for slower and steadier movements over a longer duration. Such movements can lessen patient discomfort, lower relapse risk, and may reduce or eliminate tinnitus commonly caused by the tooth movement process.

The material is also more transparent and resists staining better than current aligner materials. This can be beneficial as the patient may find these aligners more pleasing to wear as they are more difficult to see when they are being used than current aligners.

Additionally, the additional material used in the embodiments of the present disclosure provide more wrap around contact with a tooth. This can be beneficial in providing complex (e.g., twisting, erupting, receding) forces that would have been accomplished through use of dental attachments (i.e., bumps of material attached to a tooth that interact with an aligner surface). The embodiments of the present disclosure also provide a simpler, more efficient way to improve gingival height. The embodiments of the present disclosure also allow for a greater ability to straighten teeth, making them more upright and having improved axial inclinations which help maintain the new and more symmetric distribution of occlusal contact forces. These capabilities can be beneficial in treating tinnitus and gingival recession.

Some embodiments of the present disclosure utilize image recognition software for the laser can, during the cutting process virtually add 1-2 mm to the aligner beyond the tooth-gingiva interface, onto the gum, to mark where the laser should make those finishing cuts. This can also be accomplished manually by the treatment professional placing markers on a displayed virtual image of the patient's mouth or jaw. For example, the treatment professional can place markers on the image indicating points along the intended finishing line and then software can be used to connect the space between the markers, for instance through analyzing the image data to estimate an appropriate fit based in the position of the teeth in the image.

Tinnitus Treatment and Gingival Recession

Tinnitus is a phantom auditory sensation that can manifest as buzzing, hissing, and/or clicking in one or both ears that is exclusively heard by the patient. It ranges from merely a nuisance to a debilitating condition that causes severe annoyance, distraction, and discomfort. Hearing loss is a frequent comorbidity.

While tinnitus is affiliated with around 200 health conditions, it is rarely the primary diagnosis. Tinnitus sufferers report problems ranging from reduced quality and quantity of sleep to concentration lapses to exacerbation of other medical ailments.

Since nearly half of the 25 million with tinnitus end up with hearing loss, a higher percentage than non-sufferers, it is hoped that the efforts to prevent tinnitus with the stringent methodology of embodiments of the present disclosure will also help more seniors and others maintain their hearing acuity.

However, the ability to provide this treatment for and to prevent tinnitus has medico-legal impediments. Currently, the treatment of tinnitus is beyond the scope of practice for dentists. That is due to the ears, hearing, and tinnitus being beyond the typical domain of dentistry; oral cavity, neck and maxillary sinuses. Similarly, this tinnitus treatment is beyond the scope of practice for otolaryngologists who are neither trained to nor provide intraoral medical/dental care. Further, audiologists have greater restrictions because they are only able to evaluate, prevent, and treat hearing and hearing-related issues.

However, in treating patients with malocclusions through dental aligner therapy, such treatments have yielded a number of successful tinnitus-focused outcomes. Success has been defined as a significant reduction of the magnitude, type, and/or amplitude of the exclusive noises heard. When that noise is reduced to a level considered subclinical, it is no longer bothersome to the patient. So, even if the noise has not been completely eliminated, it was reduced to the point where it was undetectable or no longer adversely affecting their ability to sleep, concentrate, contribute to their depression, etc. One patient has confirmed they have been tinnitus-free for more than eight years after the dental treatment as described in the present disclosure.

The success of tinnitus-focused tooth movement therapy appears to be due to a reduction of the residual moderate and subtle sensations within the basal alveolar osseous process in the maxilla and mandible. Severe reverberations are a serious instigator of tinnitus episodes and will often lead the individual to tending to their acute problem and not ignoring the pain. They will obtain help with a common and widely available dental treatment, an occlusal adjustment. When the tops and edges of the teeth are recontoured after some enamel or restorative material (e.g., composite, amalgam, porcelain, acrylic, zirconia) is removed, the source of those severe reverberations is eliminated.

When a state of hyperocclusion is ignored and not remedied, there are consequences. One of the teeth in question might become loose or have its occlusal surface (enamel or dental restorative) cracked, chipped, or gradually worn. Excessive bite forces might trigger headaches, earaches, sinus infections, etc.

While states of severe hyperocclusion are infrequently ignored, moderate and mild states commonly persist. That is especially true when the problem is sporadic. That could explain why the mild and moderate states of hyperocclusion respond well to tinnitus-focused therapy.

As the axial inclinations of misangulated, malposed, and malpositioned teeth are improved on their way to reaching full correction, atypical and undesirable forces transmitted from the tooth and periodontal ligament to the supportive osseous substructure, and their residual reverberations, which prior to successful progress have elicited a tinnitus episode, do not trigger an adverse reaction.

The embodiments of this present disclosure will yield slow, measured, and steady movements. This is important to help provide the lasting reduction of tinnitus episodes. However, a caveat that should not be overlooked is that during the initial phases, when teeth are slightly loosened from their pre-treatment (solid) state, the tinnitus experiences commonly become worse than they were prior to care. That will continue until such time as the teeth have approached their final desired locations. Once the long term settling process starts at the end of the basal alveolar osseous complex reformulation, significant tinnitus relief will be experienced.

Further, the embodiments of this present disclosure will often eliminate the need for additions to be placed on teeth. That will allow non-orthodontist dentists to have increased confidence to provide tinnitus-focused aligner care. Additionally, if the demand for tinnitus therapy matches the tens of millions of daily US tinnitus sufferers, the ability for non-dental professionals to seek to become legally eligible and be trained to provide this novel care will be facilitated and accommodated by this significant expansion of the aligner options available.

Another aspect of the embodiments of the present disclosure is to reasonably project where the height of the gingiva would be as the teeth prudently move during treatment. This can be determined, for example, through examination of similar tinnitus-focused aligner cases and by entering height of the gingiva data, for example from previous cases, into memory.

Further, depending upon the magnitude of the tooth movement and the positive gingival growth, that reduction of gingival recession might need to be taken into account with subsequent stages along the planned dental treatment (e.g., treatment using multiple aligners). Such adjustments can be determined, for example, through examination of similar cases and by entering the amount of gingival growth and/or recession data into memory. As the number of patients treated increases, machine learning and artificial intelligence capabilities should help accelerate the enhancement of the database of information. That is expected to continue to improve the overall quality and reliability of the care provided.

Once the amount of gingival recession is determined for a point along the proposed finishing cut line, the adjustment due to embodiments of the present disclosure can be determined. For instance, if gingival recession is present, 1 mm can be "added" to the tooth-gingiva interface (onto/atop the gum) to mark where the "cuts" should be. If there is no gingival recession, 2 mm can be "added" to the tooth-gingiva interface onto/atop the gum to mark where the "cuts" will be. In-between the teeth, the interproximal gingiva, can have 2-2.5 mm of gum coverage where the finishing cut line is placed.

This "wrap-around" effect will improve the efficacy of the tooth movement force. That will diminish the need for dental material additions to be placed on teeth which are commonly used to help facilitate the intrusion, extrusion, rotation (around an elongate axis of the tooth), or translation of the teeth (other linear, arcuate, or rotational tooth movement not mentioned in this sentence). This approach takes a lot of stress placed on the teeth out of the process which may cause or exacerbate tinnitus experienced by the patient during or after dental treatment.

The efficacy of the aligner is improved by having an increased and uniform surface area be in contact with tooth and gingiva plus an equal amount of material which is placing a force on the teeth. This will be of particular help with teeth when varying efforts and duration are required to achieve the desired movements during that particular portion of the care.

The embodiments of the present disclosure create tinnitus-focused aligners to minimize the transmission of deleterious forces from the teeth to the supporting bone. Lingering reverberations in the maxilla (top jaw) and mandible (lower jaw) from undesirable occlusal (bite) forces, sufficient to initiate or exacerbate tinnitus, are diminished to the point where they're subclinical (barely perceptible). The embodiments of the present disclosure utilize a unique protocol and innovative tinnitus aligner design predicated on precepts that have shown promise in treating and preventing tinnitus. Because hearing deficits and tinnitus are highly intertwined, it is hoped that as the teeth are prudently repositioned and the basal alveolar osseous complex (supportive bone) is positively reformulated, the rate of hearing loss will be slowed as well.

Certain popular orthodontic options are believed to be deleterious to tinnitus. Examples of such options include: fixed lingual splints (metal glued to the backs of teeth), extractions, and irreversible removal of healthy enamel (esthetic incisal adjustments, occlusal adjustments, interproximal reduction [IPR]). These procedures can result in detrimental application of force on teeth and/or disruption of nerve connections that may result in or amplify tinnitus. Accordingly, the embodiments of the present disclosure do not utilize such procedures. Other advances include enhancements geared to strengthening the supportive bone, creating healthier gingiva (gums), achieving root parallelism, obviating the need for wisdom tooth removal and other highly significant benefits to this novel tinnitus-focused tooth movement therapy.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. A method for determining a finishing line of a dental aligner, the method comprising:

receiving intraoral scan data including data for at least one jaw of a patient and having data for multiple teeth on the at least one jaw and gingival surfaces surrounding the teeth;

creating a three dimensional (3D) virtual model of the teeth and gingival surfaces surrounding the teeth based on the intraoral scan data;

determining a tooth-gingiva interface for each tooth and the gingiva and surface shape of the gingiva between adjacent teeth based on the intraoral scan data;

receiving camera image data including data for the at least one jaw of a patient and having data for the multiple teeth and gingival surfaces surrounding the teeth included in the intraoral scan data;

confirming or adjusting the locations of the tooth-gingiva interface for each tooth and the gingiva and the surface shape of the gingiva between adjacent teeth based on the camera image data to create an updated 3D model;

determining a respective amount of gingival recession at the determined tooth-gingiva interface for each tooth based on the 3D model, scan data, and/or camera image data; and determining a finishing cut line having a respective offset from the determined tooth-gingiva interface for each tooth based on the determined respective amount of gingival recession for each tooth.

2. The method of claim 1, wherein the finishing cut line offset is different at a particular determined tooth-gingiva interface if gingival recession is present at the particular determined tooth-gingiva interface for each tooth.

3. The method of claim 1, wherein the finishing cut line has an offset from a closest point to an adjacent tooth of the surface shape of the gingiva between adjacent teeth.

4. The method of claim 3, wherein the finishing cut line offset is different at the closest point to an adjacent tooth of the surface shape of the gingiva between adjacent teeth if gingival recession is present at the closest point to an adjacent tooth of the surface shape of the gingiva between adjacent teeth.

5. The method of claim 4, wherein the finishing cut line offset is different at a particular determined tooth-gingiva interface if gingival recession is present at the particular determined tooth-gingiva interface.

6. The method of claim 1, wherein the finishing cut line has offsets from the determined tooth-gingiva interface for each tooth and a closest point to an adjacent tooth of the surface shape of the gingiva between adjacent teeth.

7. The method of claim 6, wherein the finishing cut line offset is different at the particular determined tooth-gingiva interface or from the closest point to an adjacent tooth of the surface shape of the gingiva between adjacent teeth if gingival recession is present at the particular determined tooth-gingiva interface.

8. The method of claim 1, wherein the finishing cut line has offsets from the determined tooth-gingiva interface for each tooth and a closest point to an adjacent tooth of the surface shape of the gingiva between adjacent teeth wherein the finishing cut line offset is different at the particular determined tooth-gingiva interface from the offset at the closest point to an adjacent tooth of the surface shape of the gingiva between adjacent teeth.

9. A dental aligner design device, comprising:

a processor; and memory, having instructions stored thereon that are executable by the processor to:

receive intraoral scan data including data for at least one jaw of a patient and having data for multiple teeth on the at least one jaw and gingival surfaces surrounding the teeth;

create a three dimensional (3D) virtual model of the teeth and gingival surfaces surrounding the teeth based on the intraoral scan data;

determine a tooth-gingiva interface for each tooth and the gingiva and surface shape of the gingiva between adjacent teeth based on the intraoral scan data;

receive camera image data including data for the at least one jaw of a patient and having data for the multiple teeth and gingival surfaces surrounding the teeth included in the intraoral scan data;

confirm or adjust the locations of the tooth-gingiva interface for each tooth and the gingiva and the surface shape of the gingiva between adjacent teeth based on the camera image data to create an updated 3D model;

determine a respective amount of gingival recession at the determined tooth-gingiva interface for each tooth based on the 3D model, scan data, and/or camera image data;

determine a finishing cut line having a respective offset from the determined tooth-gingiva interface for each tooth based on the determined respective amount of gingival recession for each tooth;

form an aligner from the updated 3D model; and cut the formed aligner along the finishing cut line.

10. The device of claim 9, wherein the finishing cut line has an offset of 0.5 mm-2.5 mm from the determined tooth-gingiva interface.

11. The device of claim 10, wherein the finishing cut line offset is 0.5 mm-1.5 mm at a particular determined tooth-gingiva interface if gingival recession is present at the particular determined tooth-gingiva interface.

12. The device of claim 10, wherein the finishing cut line offset is 1 mm-2.5 mm at a particular determined tooth-gingiva interface if no gingival recession is present at the particular determined tooth-gingiva interface.

13. The device of claim 9, wherein the finishing cut line has an offset of 2 mm-2.5 mm from a closest point to an adjacent tooth of the surface shape of the gingiva between adjacent teeth.

14. The device of claim 9, wherein the finishing cut line has an offset and wherein the finishing cut line offset is different at a first particular determined tooth-gingiva interface than at a second particular determined tooth-gingiva interface tooth.

15. The device of claim 9, wherein the finishing cut line has an offset at a particular determined tooth-gingiva interface that is different than an offset of a closest point to an adjacent tooth of the surface shape of the gingiva between adjacent teeth.

16. A tangible non-transitory machine readable medium having instructions stored in memory and executable by a processor to perform a method for determining a finishing line of a dental aligner, the method comprising:

receiving intraoral scan data including data for at least one jaw of a patient and having data for multiple teeth on the at least one jaw and gingival surfaces surrounding the teeth;

creating a three dimensional (3D) virtual model of the teeth and gingival surfaces surrounding the teeth based on the intraoral scan data;

determining an interface for each tooth and the gingiva and surface shape of the gingiva between adjacent teeth based on the intraoral scan data;

receiving camera image data including data for the at least one jaw of a patient and having data for the multiple teeth and gingival surfaces surrounding the teeth included in the intraoral scan data;

confirming or adjusting the locations of the interface for each tooth and the gingiva and the surface shape of the gingiva between adjacent teeth based on the camera image data to create an updated 3D model;

determining a respective amount of gingival recession at the determined tooth-gingiva interface for each tooth based on the 3D model, scan data, and/or camera image data;

determining a finishing cut line having a respective offset from the determined tooth-gingiva interface for each tooth based on the determined respective amount of gingival recession for each tooth;

forming an aligner from the updated 3D model; and cutting the formed aligner along the finishing cut line.

17. The medium of claim 16, wherein the method includes providing a user input interface and wherein the user confirms or adjusts the locations of the interface for each tooth and the gingiva and the surface shape of the gingiva between adjacent teeth by creating marker data that is used to create the updated 3D model having a confirmed or updated finishing cut line.

18. The medium of claim 16, further including converting the finishing cut line on the 3D model into cutting instructions for an aligner cutting machine to cut the formed aligner along the finishing cut line.

19. The medium of claim 18, wherein the aligner cutting machine is a laser cutting machine.

* * * * *